(No Model.) 6 Sheets—Sheet 1.
D. STRUNK.
COMBINED HARVESTER AND BINDER.
No. 370,360. Patented Sept. 20, 1887.
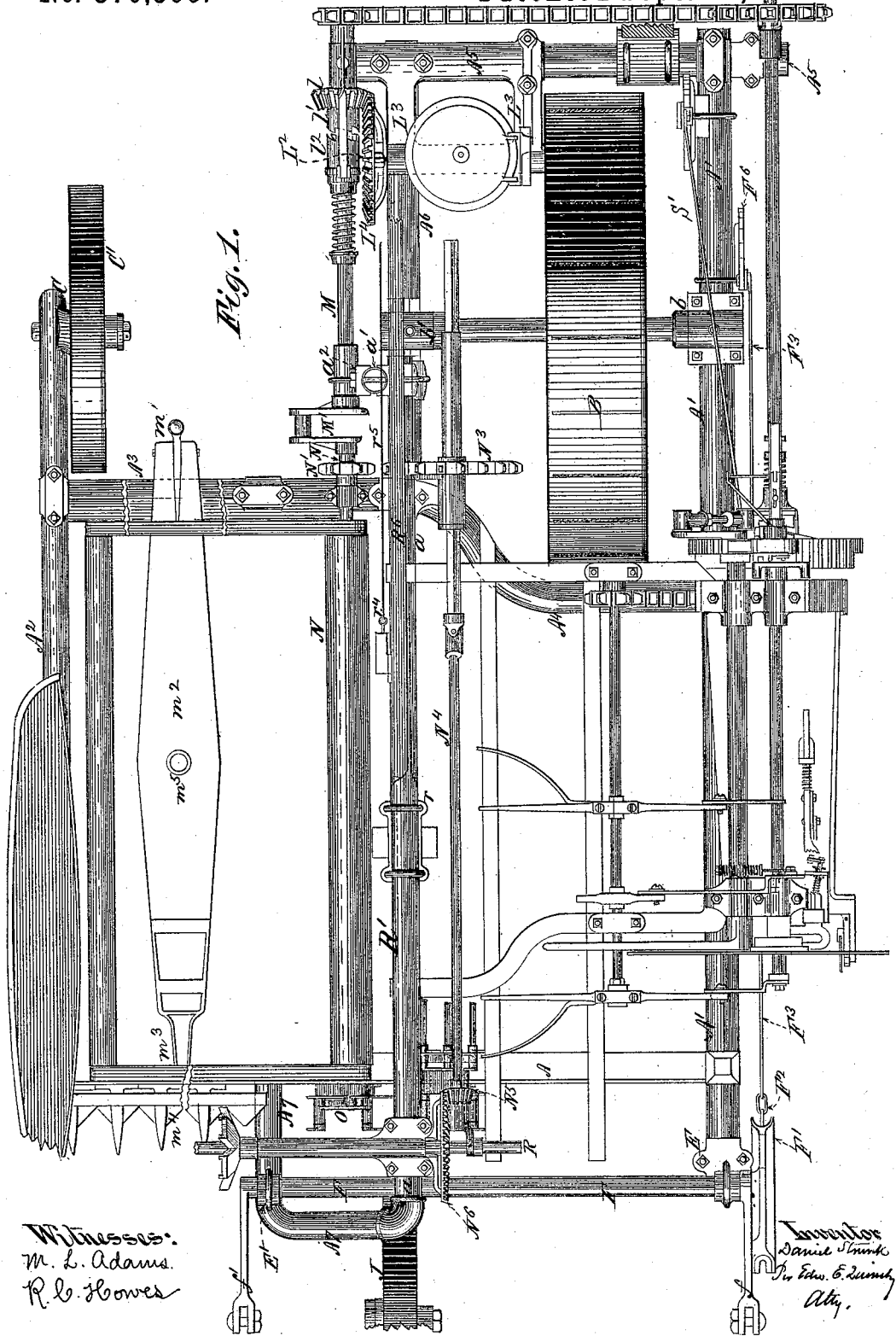

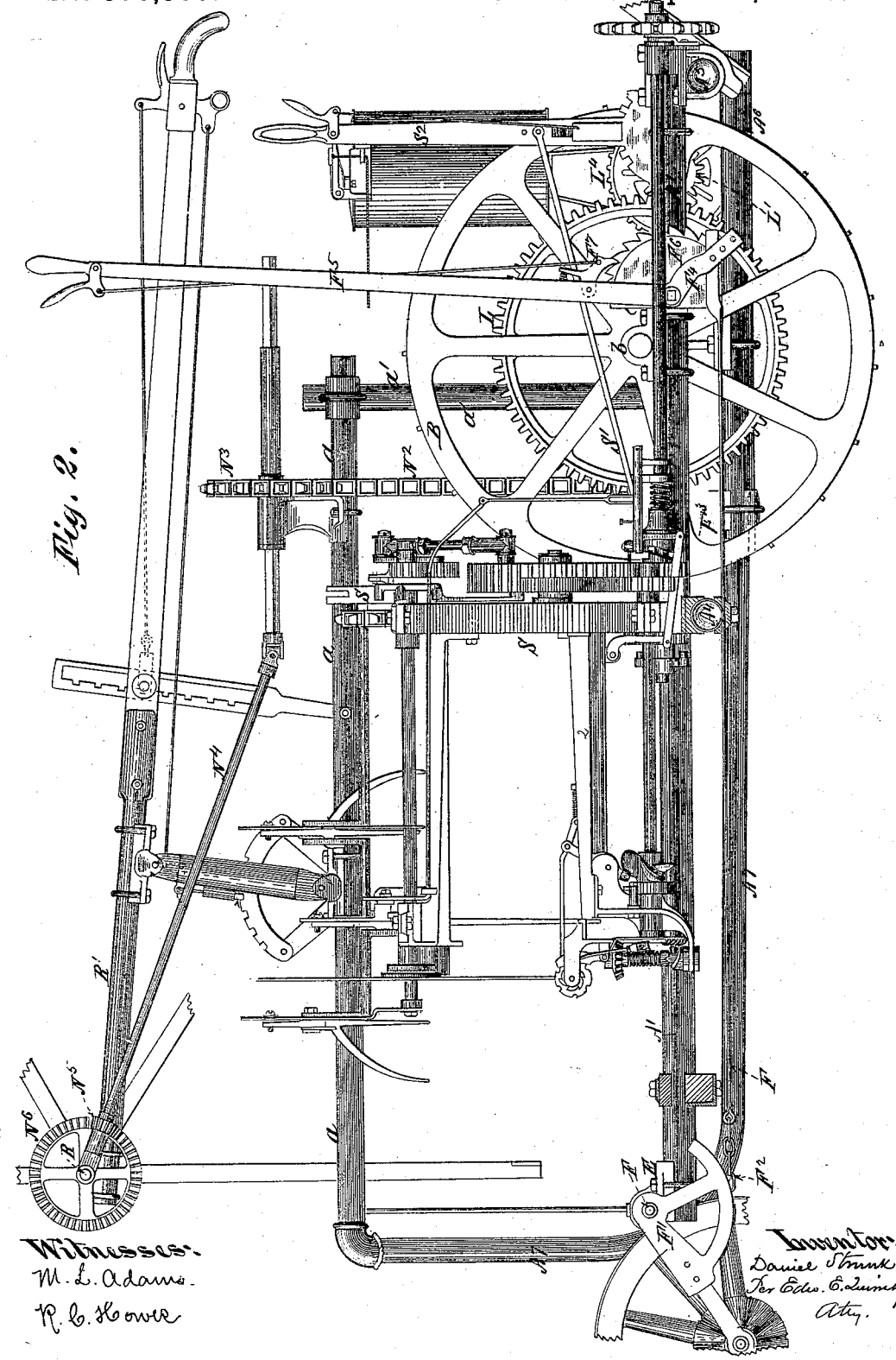

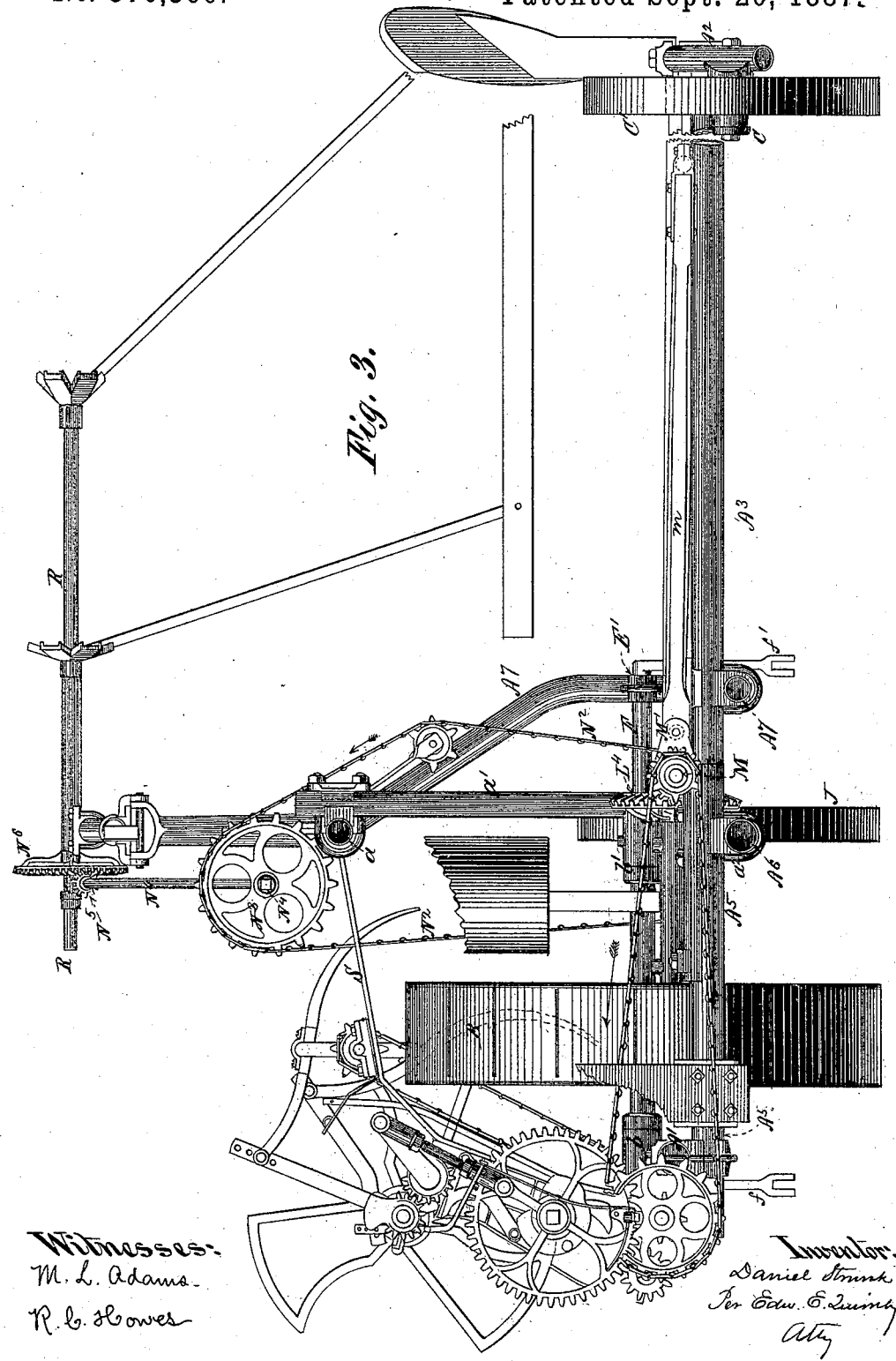

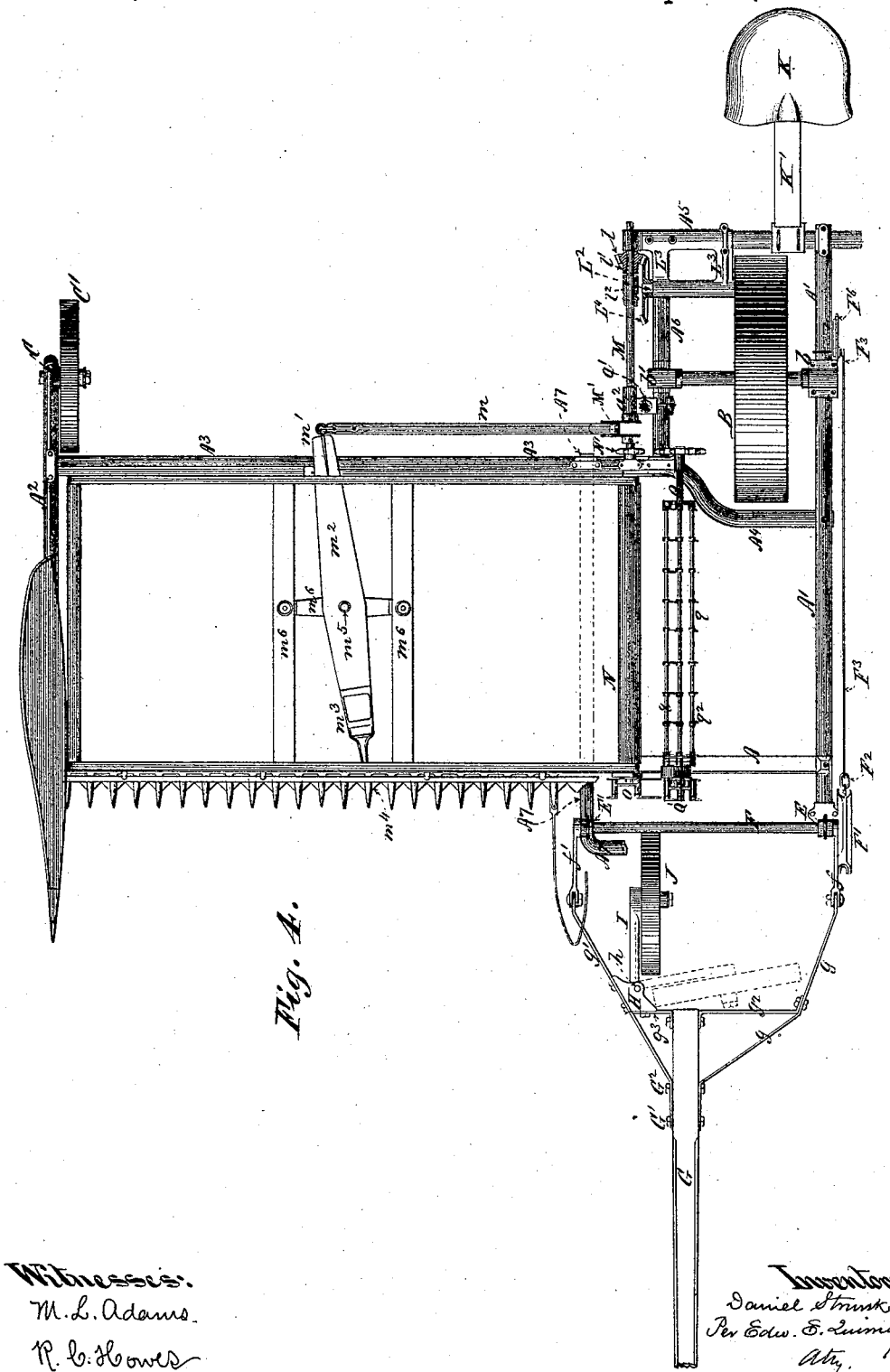

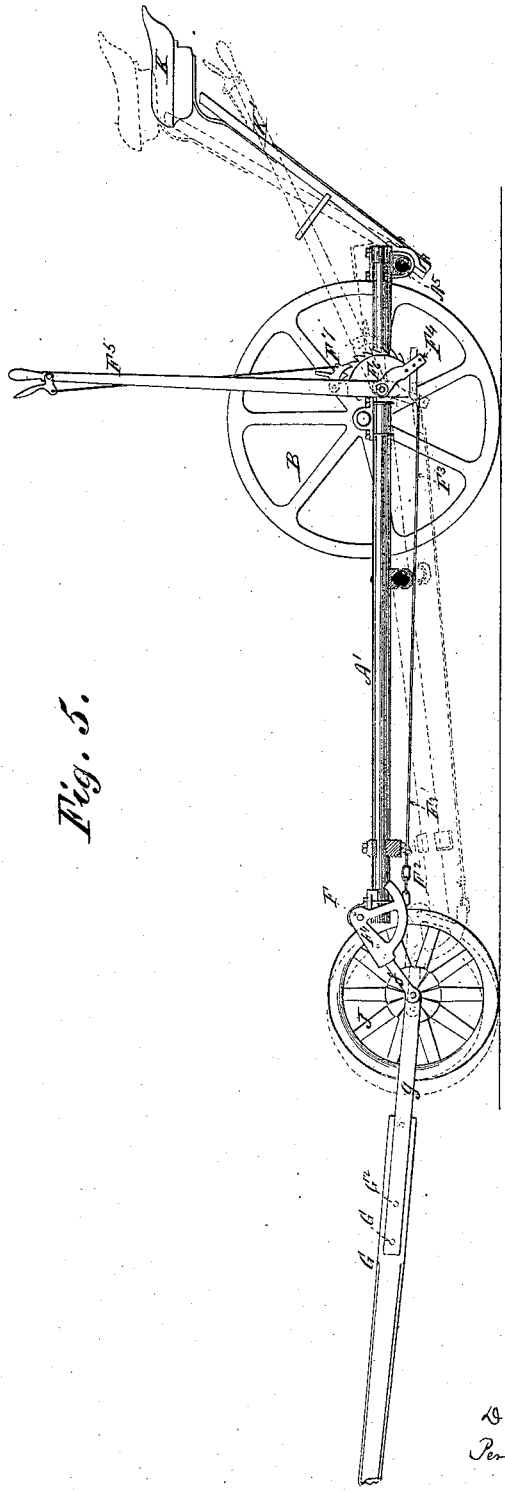

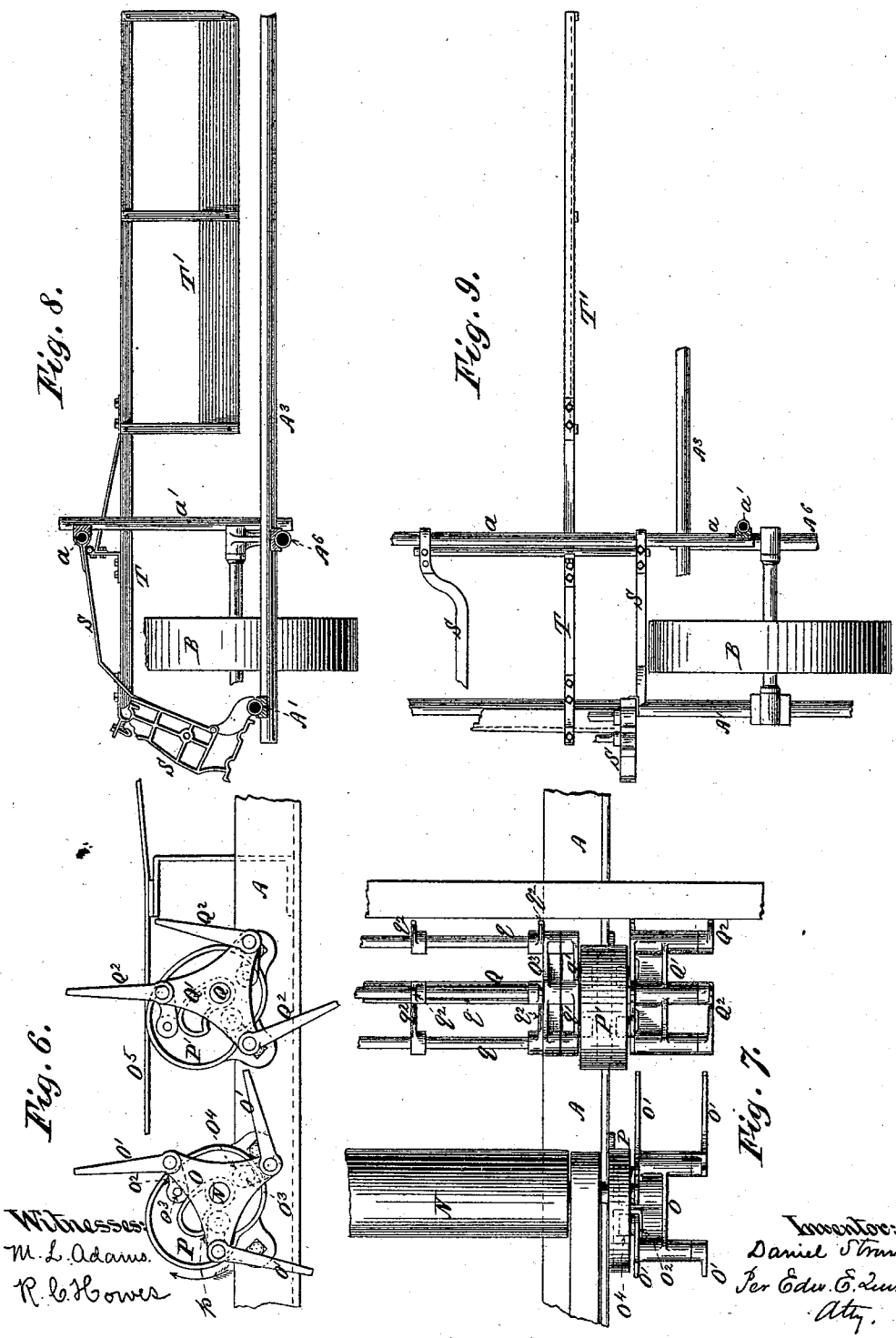

United States Patent Office.

DANIEL STRUNK, OF MINNEAPOLIS, MINNESOTA.

COMBINED HARVESTER AND BINDER.

SPECIFICATION forming part of Letters Patent No. 370,360, dated September 20, 1887.

Application filed November 10, 1884. Serial No. 147,476. (No model.)

*To all whom it may concern:*

Be it known that I, DANIEL STRUNK, of Minneapolis, Minnesota, have invented certain Improvements in Combined Harvesters and Binders, of which the following is a specification.

My improvements relate to the organization of the frame and mechanism of a combined harvester and binder, and the arrangement of the wheels for supporting the same, by means of which the cut grain is delivered sidewise from the platform-carrier to a binder-deck in front of the drive-wheel, and after having been bound is discharged from the stubble side of the binder-deck; also to the mode of attaching the hinged pole, the mode of raising and lowering the cutter-bar, the connection of the movable backboard to an adjustable binder-frame, whereby during the process of adjustment the binder-frame and the backboard are made to have a like range of movement in the same direction, the mode of vibrating the sickle-bar by means of a crank-shaft which is a rearward extension of the shaft of the canvas-driving roller, and also to the mode of hastening the movement of the butts of the grain toward the binder by means of a rotating device upon the front end of the shaft of the canvas-driving roller.

The accompanying drawings of a combined harvester and binder, illustrating my improvements, are as follows:

Figure 1 is a top view with some of the parts broken away in order to allow the remaining parts to be represented on a large scale. Fig. 2 is an elevation of the stubble side of the machine. Fig. 3 is a rear elevation with some of the parts broken away. Fig. 4 is a top view, upon a smaller scale, showing the bed-frame of the machine. Fig. 5 is an elevation of the stubble side of the frame, especially designed to illustrate the operation of the raising and lowering mechanism. Fig. 6 is a front elevation of a section of the platform, showing the rotating butt-hastening arms and the cams for rocking them upon their axes. Fig. 7 is a top view of the front portion of the platform at its delivery end, showing the butt-hastening arms and portions of the canvas-driving roller, and the rotating bars carrying the rocking arms which propel the stalks of the grain toward the binder. Fig. 8 is a rear elevation of a portion of the machine, showing the binder-frame and the mode of connecting the backboard therewith. Fig. 9 is a top view of the parts represented in Fig. 8.

The frame of my machine is metallic. Its principal members, with the exception of the finger-bar, are made of iron tubing, and are united to each other and to the finger-bar by means of suitable sockets, clamps, and bolts.

The finger-bar A is made of angle-iron, and at one end is secured to the exterior horizontal member, A', of the frame on the stubble side of the machine, and at the other end to the horizontal member $A^2$ of the frame at the grain side of the platform, to which is also secured the grain end of the rear horizontal member, $A^3$, of the frame. The latter has a horizontal forward offset, $A^4$, near its stubble end, at which it is bolted to the under side of the member A'. The offset $A^4$ is in front of the drive-wheel B. The rear end of the horizontal member A' is secured to the under side of the rear member, $A^5$, of the drive-wheel frame, which is also secured upon the rear end of the shorter member, $A^6$, the forward end of which is secured to the under side of the member $A^3$.

The box $b$, which affords the bearing for the stubble end of the drive-wheel shaft, is supported upon the outer member, A', of the frame midway between its points of connection with the rear member, $A^5$, and the offset $A^4$. The box $b'$, which affords the bearing for the grain end of the drive-wheel shaft, is supported upon the shorter member, $A^6$.

The grain-side member, $A^2$, of the frame extends backwardly and downwardly from the member $A^3$, and is secured to the axle C, upon which the grain-wheel C' turns.

Under the platform, near the delivery end thereof, is another tube, $A^7$, which extends from front to rear, and is bolted to the under side of the member $A^3$ and to the under side of the finger-bar A. The tube $A^7$ extends a short distance forward from the finger-bar, then turns first vertically upward and then in an inclined direction toward the stubble side of the machine, and at its upper extremity is secured to the front end of the horizontal tube $a$, the rear end of which is supported upon the tubular standard $a'$. The standard $a'$ is secured at the bottom in the socket-piece $a^2$, which is clamped to the horizontal member $A^6$ of the drive-wheel frame.

The stubble-side member, $A'$, of the frame extends forward from its point of attachment to the finger-bar, and is provided upon its forward end with a socket-piece, E, which affords the stubble-end bearing of the windlass-shaft F, having its grain-end bearing afforded by a box, E', bolted to the upward extension of the tube $A^7$. The rocking windlass-shaft F has affixed to its outer end the grooved quadrant F', to which is affixed one end of the windlass-chain $F^2$, the other end of which is joined to the forward end of the link-rod $F^3$. The rear end of the link-rod $F^3$ is pivoted to the shorter arm, $F^4$, of the operating-lever $F^5$, pivoted to the stationary rack-plate $F^6$, which is fastened to the horizontal member $A'$ of the frame, immediately in the rear of the box $b$. The rocking windlass-shaft F is provided with the crank-arms $f f'$, the ends of which are pivotally connected, respectively, with the rear ends of the pole-braces $g g'$. The pole-braces bend laterally toward the pole G, to the sides of which they are secured by the bolts $G' G^2$. The brace $g'$ bends at an obtuse angle at a point near its pivotal connection with the crank-arm $f'$, and thence extends in a straight line to a point upon the side of the pole a short distance forward from the rear end of the pole. The brace $g$ bends at a more obtuse angle from near its pivotal connection with the crank-arm $f$, and extends forward to a point nearly opposite the rear end of the pole, at which place it makes a more abrupt bend toward the side of the pole opposite the point to which the forward end of the brace $g'$ is bolted.

A bridge-brace, $g^2$, is bolted at one end to the rear end of the pole G, and at the other end to the pole-brace $g$. A similar but shorter bridge-brace, $g^3$, is bolted to the rear end of the pole G and to the pole-brace $g'$. The obtuse angle formed by the juncture of the rear side of the bridge-brace $g^3$ with the inner side of the pole-brace $g'$ is filled by the bracket H, which is securely bolted to the pole-brace $g'$ and to the bridge-brace $g^3$. The bracket H is transversely perforated to receive the pin $h$, which serves to pivotally connect the bracket H with the forward end of the arm I, the rear end of which is affixed to the axle upon which the leading-wheel J turns.

It will be seen that the machine is provided with three points of support, which are respectively the drive-wheel B, the grain-wheel C', and the leading-wheel J. When the machine is turned to the driver's right, the arm I swings upon the pin $h$, so that the arm I and leading-wheel J may occupy the positions in which they are indicated in dotted lines in Fig. 4. When the machine is being moved forward in a right line, the wheel J and arm I occupy the positions in which they are represented in solid lines in Fig. 4. In this position the axis of the wheel J and the pivotal connections of the pole-braces with the crank-arms are in alignment with each other. The front of the machine is raised by pushing forward the operating-lever $F^5$, thus rocking the crank-arms $f f'$ upon their pivotal connections with the pole-braces and moving them into or toward the positions in which they are represented in solid lines in Figs. 2 and 5.

The operating-lever $F^5$ is held stationary and the front of the machine sustained in its elevated position by means of the usual retaining-pawl, $F^7$, pivoted to the operating-lever $F^5$ and engaging the ratchet-teeth of the stationary rack-frame $F^6$. The lowering of the cutter-bar is effected by disengaging the retaining-pawl and allowing the operating-lever $F^5$ to sway backward, thus paying forward the chain $F^2$ and allowing the quadrant and crank-arms to rock into or toward the positions in which they are indicated in dotted lines in Fig. 5. In the operation of raising or lowering the finger-bar the frame rocks upon the axis of the drive-wheel and upon the axis of the grain-wheel, the axes of these wheels being in substantially the same vertical plane.

The driver's seat K is secured to the upper end of the inclined spring-bar K', bolted to the rear member, $A^5$, of the drive-wheel frame.

Power is transmitted from the drive-wheel by the engagement of the gear L with the pinion L' upon the stubble end of the counter-shaft $L^2$, provided with bearings in the forward ends of the arms $L^3 L^3$, securely bolted to the rear member, $A^5$, of the drive-wheel frame. Upon its grain end the shaft $L^2$ is provided with the bevel-wheel $L^4$, which engages a bevel-pinion, $l$, loosely mounted upon a horizontal shaft, M. The hub $l'$ of the pinion $l$ is provided upon its forward end with crown-teeth for engaging the teeth of the sliding clutch-half $l^2$, splined to the shaft M. The shaft M is in alignment with the shaft of the canvas-driving roller N, with the rear end of which it is connected by the double crank M'. A pitman, $m$, connects the crank M' with the rear end, $m'$, of the lever $m^2$, the forward end of which, $m^3$, is suitably connected with the sickle-bar $m^4$. The lever $m^2$ vibrates upon the vertical axis afforded by its pivotal connection $m^5$ with the light frame $m^6$, extending across from the front to the rear sills of the platform, immediately beneath the carrier. The forward end of the driving canvas-roller shaft N extends forward in front of the finger-bar, and has affixed to it a spider, O. The spider O is provided with three or more holes, which are parallel with and equidistant from the shaft N. These holes serve, respectively, as the bearings for the shafts of the butt-hastening arms O'. The rear end of each of these shafts is provided with a crank-arm, $O^2$, to which is affixed a rearwardly-projecting crank-pin, $O^3$, inserted loosely through a roller, $O^4$. The rollers $O^4$ are engaged by the grooved cam P, which is bolted to the front side of the finger-bar. Butt-hastening arms may be affixed to both the front and rear ends of each of the short shafts, having their bearings in the plate O, as shown in Fig. 7.

The operation of the butt-hastening arms O' is peculiar. By the rotation of the shaft N they are successively carried upward toward the grain. As each arm rises, the collision of its roller $O^4$ with the point $p$ of the cam rocks the arm quickly upon its axis just as it reaches the overhanging butts of the grain. By this quick rocking motion the arm lifts and impels the butts of the grain toward the binder-table $O^5$.

I employ a similar system of rotating rocking arms for catching the grain as it is delivered from the platform-carrier and pushing it forward upon the binder-table. For the latter purpose, I provide a shaft, Q, which is parallel with the canvas-roller shaft N, and is provided with bearings upon the front and rear sills of the platform. I have the shaft Q project forward from the finger-bar A and affix to it a spider, Q', which, like the spider O, is provided with holes for the reception of the shafts of the rocking arms $Q^2$. I make these shafts either longer or shorter than the shafts of the rocking arms O', in order that the paths of movement of the arms O' and $Q^2$, respectively, may be in different vertical planes, so that there shall be no collision between them. The rocking of the arms $Q^2$ is controlled by the front face of the cam P', which is similar to the cam P, and, like that, is bolted to the finger-bar A. The cam P', however, is a double cam, and has formed upon its rear face a cam-groove similar to that upon its front face. The shaft Q has affixed to it, between its bearings, two or more spiders, $Q^3$, provided with holes to serve as the bearings for the horizontal bars $q$, each of which is provided upon its front end with a crank, $q'$, the crank-pin of which is inserted in a roller engaging the inner face of the double cam P'. Arms $q^2$ are affixed to the bars $q$ at suitable intervals, and are carried bodily around a common center by the rotation of the shaft Q and so rocked upon their individual axes as to catch under and impel the stalks of the grain toward the binder.

Power to rotate the shaft Q is transmitted from the sprocket-wheel N' by means of the sprocket-chain $N^2$, which passes under the sprocket-wheel N' and under another sprocket-wheel affixed to the rear end of the shaft Q, the sprocket-chain $N^2$ being also utilized to drive the sprocket-wheel $N^3$, which is loosely splined to the knuckle-shaft $N^4$, the forward end of which is provided with the bevel-pinion $N^5$, which engages and drives the bevel-wheel $N^6$, affixed to the reel-shaft R.

The binding mechanism is erected upon a frame, S, which is provided with sliding bearings upon the side member, A', of the frame, and upon the upper horizontal member, $a$, of the frame. It is moved backward or forward for the purpose of adjusting the binding mechanism by power transmitted through the connecting-rod S' from the usual operating-lever, $S^2$, the handle of which is within convenient reach of the driver's seat. A horizontal arm, T, is suitably fastened across the rear end of the frame S, and extends therefrom toward the grain side of the machine at a suitable elevation above the platform, and has secured to it the backboard T'. The arm T and the backboard T', secured thereto, are thus made to move with the binder-frame S when the latter is being adjusted.

I claim as my invention—

1. The combination, with the main frame of the harvester, supported at its stubble end in the rear upon the drive-wheel and in front upon a leading-wheel, of the rock-shaft arranged in front of the delivery end of the platform-carrier and provided with crank-arms, leading-wheel located in such a manner that when the machine is drawn forward its axis is in line with the pivots of the tongue-braces, and means, substantially as described, for operating said rock-shafts.

2. The combination and arrangement, as herein shown and described, of the main frame, the rocking windlass-shaft F, provided with the crank-arms $f f'$, the pole-braces $g$ and $g'$, pivotally connected to the crank-arms and rigidly fastened to the pole G, the leading-wheel J, mounted upon an axle affixed to the free end of the laterally-swaying arm I, pivotally connected with the bracket H, rigidly connected with the rear end of the pole, and means for operating said rock-shaft.

3. The movable backboard T', supported by the arm T, in combination with the adjustable binder-frame S, said board and frame being rigidly connected, so as to move together, substantially as set forth.

4. The combination, as herein described, of the platform-canvas, the canvas-driving-roller shaft N, projecting at its forward end in front of the front sill of the platform, a spider-wheel mounted upon the projecting forward end of the shaft N, a system of butt-hastening arms pivoted to the spider-wheel, and a cam affixed to the platform for rocking the butt-hastening arms upon their pivots, as and for the purpose set forth.

5. The system of pivoted butt-hastening arms carried upon the forward end of the shaft N of the canvas-driving roller, and having the motions described, in combination with the similarly-operated system of like pivoted butt-hastening arms carried upon the forward end of the horizontal rotating shaft Q, for the purpose of continuing the impulsion of the butts of the grain toward the binder, substantially as shown and described.

DANIEL STRUNK.

Witnesses:
C. M. CASTLE,
HENRY HONKOMP.